(12) United States Patent
White (10) Patent No.: US 10,332,186 B2
(45) Date of Patent: Jun. 25, 2019

(54) METHOD AND SYSTEM FOR ARTIFICIAL INTELLIGENCE AUGMENTED FACILITY INTERACTION

(71) Applicant: NCR Corporation, Duluth, GA (US)

(72) Inventor: Joseph Arnold White, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 871 days.

(21) Appl. No.: 14/810,931

(22) Filed: Jul. 28, 2015

(65) Prior Publication Data

US 2017/0032442 A1 Feb. 2, 2017

(51) Int. Cl.
*G06Q 30/00* (2012.01)
*G06Q 30/06* (2012.01)
*G06N 5/02* (2006.01)

(52) U.S. Cl.
CPC ......... *G06Q 30/0631* (2013.01); *G06N 5/022* (2013.01)

(58) Field of Classification Search
CPC ............................ G06Q 30/0631; G06N 5/022
USPC ........................................................ 705/26.7
See application file for complete search history.

(56) References Cited

U.S. PATENT DOCUMENTS

| 9,760,927 | B2* | 9/2017 | Todasco | H04W 4/70 |
| 2010/0161400 | A1* | 6/2010 | Snodgrass | G06Q 30/02 705/14.16 |
| 2011/0028160 | A1* | 2/2011 | Roeding | G06Q 30/00 455/456.1 |
| 2012/0259732 | A1* | 10/2012 | Sasankan | G01S 5/0205 705/26.9 |
| 2013/0285855 | A1* | 10/2013 | Dupray | G01S 19/48 342/451 |
| 2014/0094208 | A1* | 4/2014 | Egner | H04W 72/085 455/513 |
| 2014/0249902 | A1* | 9/2014 | Isaacson | G06Q 30/0217 705/14.19 |
| 2015/0039461 | A1* | 2/2015 | Gadre | G06Q 30/0639 705/26.7 |
| 2015/0330805 | A1* | 11/2015 | Cho | G01C 21/3484 701/428 |
| 2015/0363943 | A1* | 12/2015 | Yalniz | G06K 9/00496 345/591 |

OTHER PUBLICATIONS

Mobile Device Resource Conservation During Geolocation Operations; Anonymous; IP.com No. IPCOM000231493D; IP.com Electronic Publication Date: Oct. 2, 2013.*

* cited by examiner

*Primary Examiner* — Jeffrey A. Smith
*Assistant Examiner* — Lalith M Duraisamygurusamy
(74) *Attorney, Agent, or Firm* — Schwegman, Lundberg & Woessner (57) ABSTRACT

Various embodiments herein each include at least one of systems, methods, software, and devices for artificial intelligence augmented facility interaction. One such embodiment, in the form of a method includes identifying a location of a mobile device associated with a customer account within a facility. This method further includes determining at least one product recommendation based on data stored in a database associated with the customer account in view of the identified location and transmitting, via a network, the determined product recommendation data to the mobile device for presentation on the mobile device.

16 Claims, 8 Drawing Sheets

Current position and past positions are used to determine probable future positions.

- D = Average deviation from linear path along a sliding window of historical points
- V = Average Rate of speed as an average of a sliding window of historical points
- T = Trajectory of travel expressed in degrees with 0=N and 180=S
- P = Array of positional data points
- L = probable next point
- C = Last Reported point calculated by triangulation
- RC = System calculated actual current location – reported as current location based on Velocity, path of travel, and heading from last known point

- This system also reduces the effect of RF noise on positioning

METHOD AND SYSTEM FOR ARTIFICIAL INTELLIGENCE AUGMENTED FACILITY INTERACTION

BACKGROUND INFORMATION

Facilities, such as retail outlets, strive to enhance customer experiences and to maximize sales per customer visit. To do so, facilities typically strive to provide intuitive facility layouts to make it easy for customers to find desired products, view new products they may not be aware of, identify sale items, and the like. To these ends, facilities traditionally have personnel located throughout the facility to answer customer questions, drive sales, guide customers, and otherwise assist customers. However, personnel are expensive, require training, and to maximize their usefulness to customers, they need to develop a relationship with the customer to understand their needs, capabilities, and likes. In modern big-box retail outlet facilities, the expense and training required meet customer needs is considerable. Further, the number of customers that frequent a big-box retail outlet facility make it virtually impossible for personnel to develop relationships with even a fraction of the customers.

SUMMARY

Various embodiments herein each include at least one of systems, methods, software, and devices for artificial intelligence augmented facility interaction. One such embodiment, in the form of a method includes identifying a location of a mobile device associated with a customer account within a facility. This method further includes determining at least one product recommendation based on data stored in a database associated with the customer account in view of the identified location and transmitting, via a network, the determined product recommendation data to the mobile device for presentation on the mobile device. In some such embodiments, identifying the location of the mobile device associated with the mobile device includes iteratively determining an unfiltered location based on at least three received beacon signals, beacon location data retrieved from a database for the beacons from which the beacon signals were received, and application of a triangulation algorithm to the beacon location data. Some such embodiments may also iteratively determine a filtered location by calculating a location average and standard deviation from at least three most recently determined unfiltered locations and applying the triangulation algorithm to at least three most recently determined unfiltered locations that are less than the standard deviation from the location average. The filtered location in such embodiments may be utilized as the identified location.

Another embodiment, in the form of a system includes at least one processor, at least one memory device, and at least one network interface device. Such embodiments further include a mobile device interaction module stored on the at least one memory device and executable by the at least one processor to perform data processing activities. The data processing activities may include identifying a location of a mobile device associated with a customer account within a facility and determining at least one product recommendation based on data stored in a database associated with the customer account in view of the identified location. Such embodiments may then transmit, via the at least one network interface device to the mobile device, the determined product recommendation data for presentation on the mobile device.

DETAILED DESCRIPTION

Various embodiments herein each include at least one of systems, methods, software, and devices for artificial intelligence augmented facility interaction. Some such embodiments identify that a consumer carrying a mobile device is present at a facility, such as a retail outlet. The customer presence may be detected by an app that executes on the mobile device receiving a radio signal from a beacon device deployed at the facility that includes a beacon identifier encoded in the signal. The mobile device app may then transmit an identifier of the customer, such as an identifier of an account of the customer, to a server of an operator of the facility along with the beacon identifier. The server then associates the customer to the customer account based on the account identifier and identifies the facility based on the beacon identifier that is registered on the server, or in a database accessible to the server, in association with the facility.

In some embodiments, a customer location within the facility may then be identified on a continuing basis while the customer is present at the facility by triangulating the customer location based on a plurality of beacon signals received by the customer's mobile device, such as a smartphone or tablet. The mobile device app may identify the location within the facility in relation to a map of the facility including geographic location metadata associated therewith and send location information to the server. In other embodiments, the mobile device app may transmit received beacon identifiers to the server to allow the server to identify the location. Some embodiments further include projecting a path of the customer based on the beacon data.

The server, being aware of one or both of the customer location and projected path may provide product recommendations to the customer via their mobile device based thereon. For example, a process may execute on the server to generate product recommendations that takes into account data associated with the customer account. This data may include a product purchase history, a product browsing history, a wish list, a shopping list, customer provided preference data, and the like. The product recommendation service may then generate a list of product recommendation, which may be ranked. The product recommendations may be identified based on one or more the various customer data, known similarities between products, purchase histories of other customers that purchased or browsed products included in the customer data (e.g., purchase history, shopping and wish lists, etc.), and the like. Once the ranked product recommendation list is generated, product recommendations may be provided based on product locations at the facility as represented in stored data on, or accessible, to the server. As the server becomes aware of the customer location or projected path near a product included in the ranked product recommendation list, the server may transmit a notification to the customer in their mobile device app of a product. The notification may include a promotional offer, product information, and a product location. This data, including the product location may then be presented by the mobile device app including a map that shows a plotting of the customer's current location at the facility and a location of the recommended product in the facility.

Similar functions may be performed with regard to product queries received from the customer as input into the mobile device app and communicated to the server. The server may replay with product information with regard to a product being searched for along with location information that may be equally presented on the map.

In some embodiments, a recommended product may be located in the facility on a smart display apparatus, such as a rack or shelve. A smart display apparatus may include an attraction feature, such as a light or speaker, or a product presentation function, such as orienting a rack to present a product in a particular direction. Such a smart display may include a small computing device, such as a Raspberry Pi, that is capable of receiving commands wireless via a network from the server, to perform an action, such as illuminating or activating an attraction feature or orienting a rack in a certain manner. Thus, when a product recommendation is provided by the server to a customer's mobile device app, the server may also send a command to a smart display apparatus to perform one or more actions that will either draw the customer's attention to a location where a recommended product may be located or present a recommended product in a manner such that the customer can more easily locate the recommended product.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices.

Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
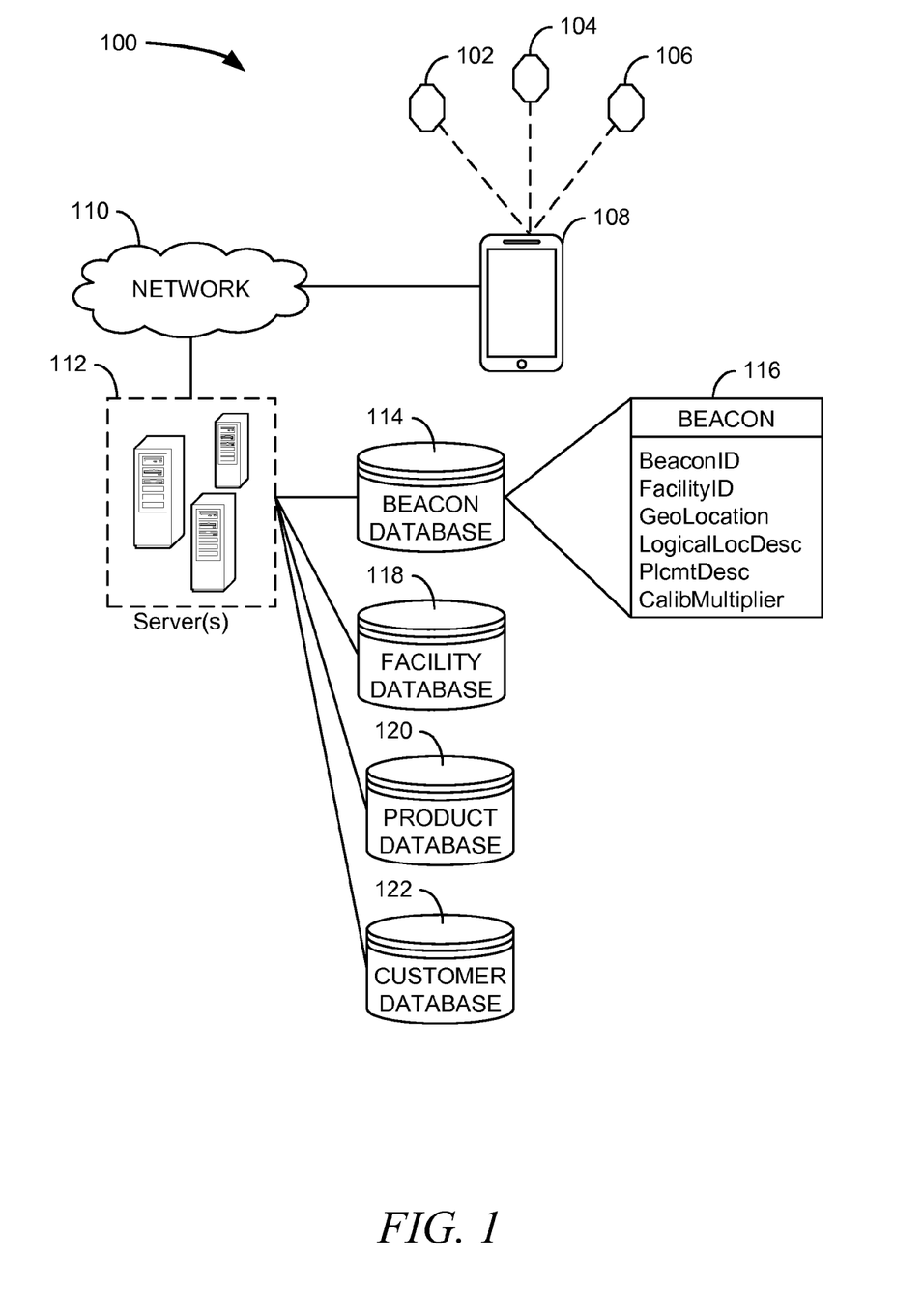
FIG. 1 is a logical block diagram of a system, according to an example embodiment.

FIG. 1 is a logical block diagram of a system 100, according to an example embodiment. The system 100 includes a plurality of beacon devices 102, 104, 106, such as BLUETOOTH® beacon devices, that are deployed in a facility. The system 100 further includes a mobile device 108 that connects wirelessly to a network 110, such as the Internet. Also connected to the network 110 are one or more servers 112. The one or more servers 112 are also connected to or house a beacon database 114, a facility database 118, a product database 120, and a customer database 122.

The beacon database 116 stores beacon-related data that includes a BEACON table 116. The facility database 118 stores data with regard to facilities, which may include one more maps of each facility, facility configuration data such as locations of product displays, products, checkout stations, customer assistance stations, and the like. Maps of facilities typically include geographic location metadata that corresponds to a location schema, such as latitude and longitude, to facilitate plotting of locations on a map when presented to illustrate a customer location, product location, a predicted customer path, and locations of things located within a facility. The facility database may further store information with regard to promotions taking place at the facility. The product database 120 stores data with regard to products offered for sale or viewing at a facility. The product database 120 may further include information with regard to promotions products included in the product database. The customer database 122 stores data with regard to customer accounts, such as product purchase and browsing histories, which may include historical data from not only in one or more facilities, but also any such activity that may have been performed online via a website or mobile device app of an operator of the facilities represented in the facility database 118. The customer database 122 may further store customer preference data (e.g., colors, sizes, brands, designers, materials, etc.), customer demographic information, customer discount and loyalty program data, customer wish lists, customer shopping lists, customer analytic data generated for the customer such as products the customer is likely interested in, and other data depending on the particular embodiment. Although the beacon database 114, facility database 118, product database 120, and customer database 122 are each illustrated as distinct databases, the data of these databases may be stored in fewer or more actual databases deployed at one or more locations. Further, additional data and databases may be present in some embodiments.

The BEACON table 116, as illustrated according to an example embodiment, includes data with regard to a plurality of beacon devices deployed to one or a plurality of facilities. The data may include a unique beacon identifier (BeaconID) that is included in radio signals broadcast by a beacon device, a facility identifier (FacilityID), and a precise geographic location (GeoLocation) where the respective beacon device is deployed, which may be expressed in latitude and longitude coordinates. The data of the BEACON table 116 may further include a logical location description (LogicalLocDesc) that may provide a simple description of the location where the respective beacon device is deployed, such as "aisle 4". The data of the BEACON table 116 may also include a placement description (PlcmtDesc) that provides detail of where the respective beacon device is deployed, such as "aisle 4, above the middle shelving system." Some embodiments of the BEACON table 116 and the system 100 further include a calibration multiplier (CalibMultiplier). A calibration multiplier may be included to apply to a signal received from the respective beacon device when the signal is received within the deployed environment that is either too weak or too strong due to environmental factors. The calibration multiplier, in some embodiments, is determined as part of a calibration process performed after the beacon devices 102, 104, 106 are deployed and then stored in the BEACON table 116. A calibration multiplier may be a value greater than zero that is applied to a signal strength to modify the signal strength when utilized to determine a location of the mobile device 108. To decrease a signal strength, the calibration multiplier value is great than zero and less than one. To increase a signal strength, the calibration multiplier value is greater than one. If the signal strength does not need to be modified, the calibration multiplier value may be NULL, zero, or one, depending on the particular embodiment.

The mobile device 108 includes an app that executes thereon. The mobile device 108 includes at least one transceiver device, which typically includes WI-FI® and BLUETOOTH® transceiver devices. At least one of the transceiver devices receives radio signals broadcast by the beacon devices 102, 104, 106. As mentioned above, the received radio signals include a signal strength, which may be determined on the mobile device 108 based on an attenuation of the received radio signals, and the radio signals include a beacon device identifier of the beacon device 102, 104, 106 that broadcast the respective radio signal. The mobile device 108 app, upon receipt of a plurality of beacon 102, 104, 106 signals, such as at least three signals in some embodiments, determines a location of the mobile device 108. The location may be determined by processing on the mobile device 108, processing offloaded to one or more server 112 processes, or a combination of the two. The processing may further include determination and projection of a path the customer carrying the mobile device has traveled and will travel if continuing on the same path. Further details of how the location and path are determined in some embodiments are provided with regard to various embodiments in FIG. 3, FIG. 5, FIG. 6, and FIG. 7 and the descriptions thereof. Note however that locations may be determined differently in other embodiments, such as through use of global positioning system (GPS) circuitry and software that may be present on the mobile device 108 and other indoor location determination systems and services.

Figure 2:
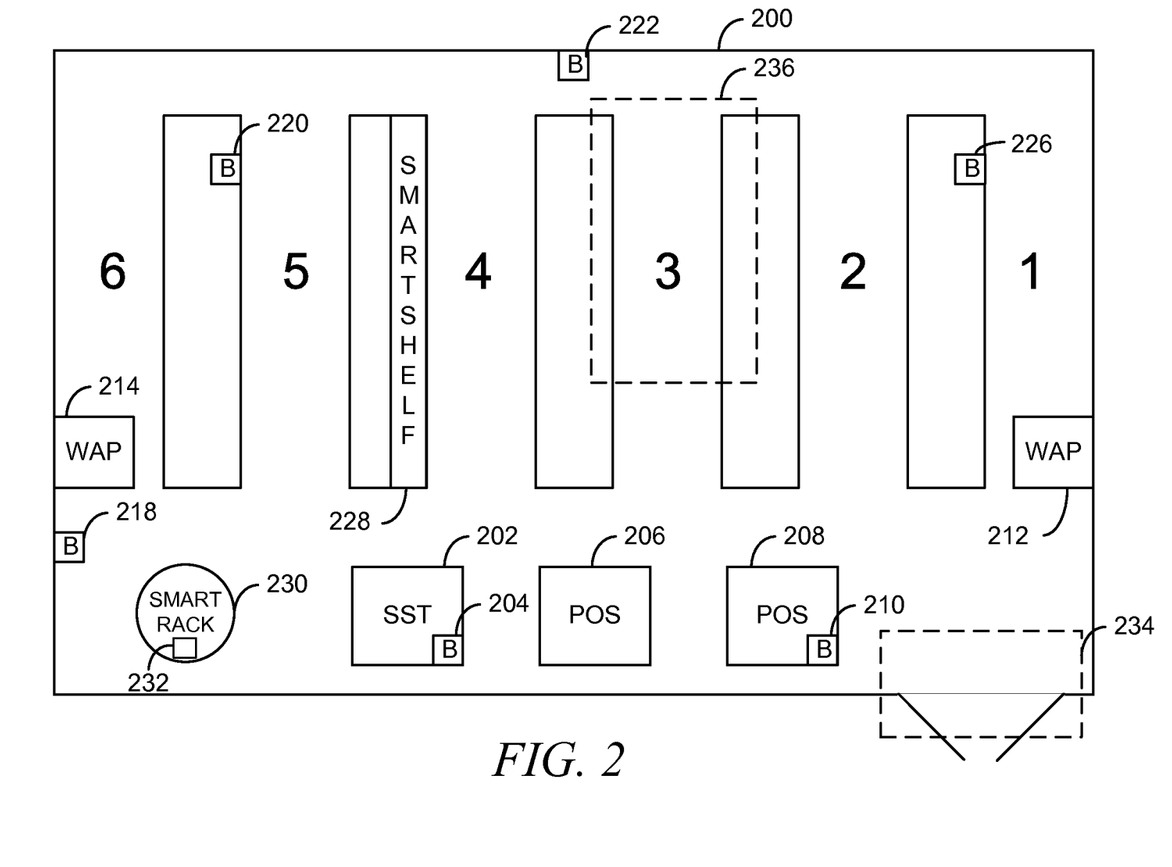
FIG. 2 is an illustration of a facility layout and configuration, according to an example embodiment.

With the system 100 in mind, FIG. 2 is provided to illustrate operation of the system 100 at a facility 200 of FIG. 2. FIG. 2 is an illustration of a facility 200 layout and configuration, according to an example embodiment.

The facility 200 includes an entrance at the area 234 and a set of Point of Sale (POS) terminals 202, 206, 208. Deployed at the facility 200 are a set of positioning devices that may be devices such as one or both of dedicated positioning devices such as BLUETOOTH® beacon devices 204, 210, 218, 220, 222, 224, 226 and WI-FI® Wireless Access Points (WAP) 212, 214. BLUETOOTH® beacon devices as described are available from NCR Corporation of Duluth, Ga. among other manufacturers. Regardless of the positioning device type, the signal includes a positioning device identifier that is registered in a database in association with a geographic location identifier, such as latitude and longitude coordinates of a location where the positioning device is deployed. An example of this registration is in the BEACON table 116 of FIG. 1.

The facility 200, as illustrated, also includes six numbered aisles 1-6. Additionally, the facility 200 includes a smart shelf 228 and a smart rack 230. The smart shelf 228 and the smart rack 230 are examples of a smart display apparatus discussed above. The smart rack is illustrated as including a computing device 232, such as a Raspberry Pi, that is capable of receiving commands wirelessly via a network from a server, to perform an action, such as illuminating or activating an attraction feature or orienting the smart rack 230 in a certain manner. The computing device 232 may also include one or a plurality of radio frequency identifier tag (RFID) readers that can read RFID tags affixed to products on the smart rack 230 for purposes of taking a current inventory to inform product recommendation processes that the smart rack 230 holds a particular product being sought. When a plurality of RFID readers are present, a location of a product on the smart rack 230 may be identified. The computing device 232 may further include a compass or other direction finding mechanism to identify and track an orientation of the smart rack 230. The compass may be used to present a product present on the smart rack 230 at a location identified by one or more of a plurality of RFID readers, when present, in a certain direction based on a direction of the smart rack 230 sensed by the compass. The smart shelf 228 may also include a computing device 232 and other electronic devices as described with regard to the smart rack 230. However, the smart shelf 228, rather than rotating the smart rack 230 to oriented a product in a direction of a customer, instead may include illumination or mechanical devices to indicate where a product being sought or recommended is located.

Figure 3:
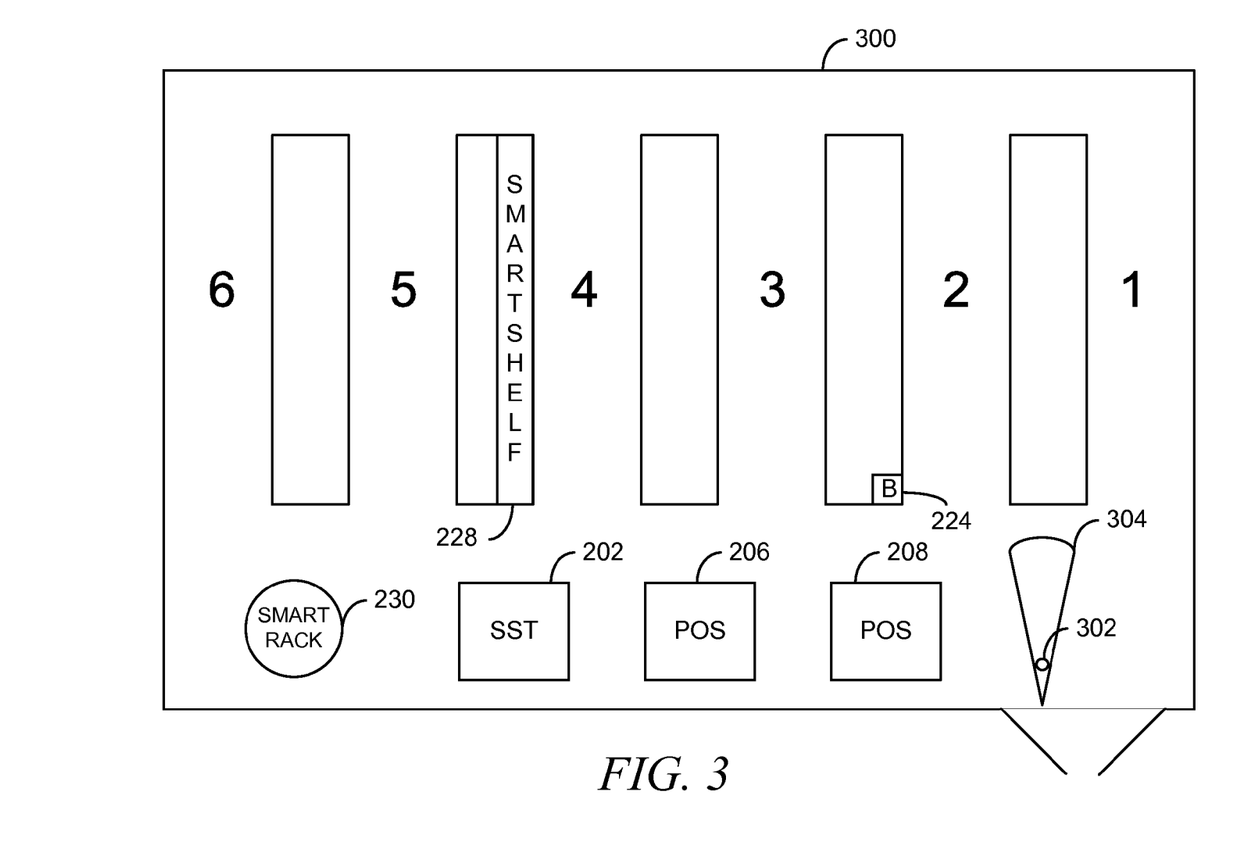
FIG. 3 is an illustration of a facility map including a plotted current location and a path prediction, according to an example embodiment.

The facility 200 may also be configured in data, such as may be stored in the facility database 118 of FIG. 1. Facility configuration data may include defined areas 234 and 236. These defined areas may be associated with data processing actions. For example, when a customer mobile device is located in area 234, which is an entrance and exit to the facility 200, a process may be triggered to first determine whether the customer is arriving or departing based on recently determined location data. When the customer is determined to be entering the facility 200, a facility 200 map, such as is illustrated in FIG. 3, may be sent to the customer mobile device app if it is not already stored thereon. Further data may also be sent, such as data representative of current facility or product promotions. A product recommendation generation process for the customer may also be triggered to identify products that the customer has previously expressed an interest in, has included on a wish or shopping list, are related to other purchased or viewed products, and the like. However, if the customer is leaving, other data processing activities may be triggered. For example, if the customer was known to have lingered in an area of a certain product type but did not purchase a product of that product type, an offer may be generated for such a purchase and sent to the customer's mobile device app in an attempt to generate a potential sale. A thank you for visiting message may also or alternatively be generated and sent.

With regard to the defined area 236, this may be an area where certain product types are located, such as televisions. One or more rules may be defined within the facility configuration when a customer determined to be located within the area. One rule may be triggered upon determining the customer has been present within the area 236 for a certain time, such as five minutes. This rule, when triggered may cause entry of data in the customer's account data indicating the customer has a likely interest in products located in the area 236, such as televisions and television accessories. Another rule may be triggered upon determining the customer has been present within the area 236 for a longer time, such as to send a message to personnel responsible for the area 236 to approach the customer and provide a promotional offer. Other rules and other actions and data processing activities may be triggered in such embodiments.

FIG. 3 is an illustration of a facility map 300 including a plotted current location 302 and a path prediction 304, according to an example embodiment. The facility map 300 is an example of map that may be presented on a display of a mobile device to a customer. When presented, the customer's current location 302 may be presented and also the path projection 304 in some embodiments.

Figure 4:
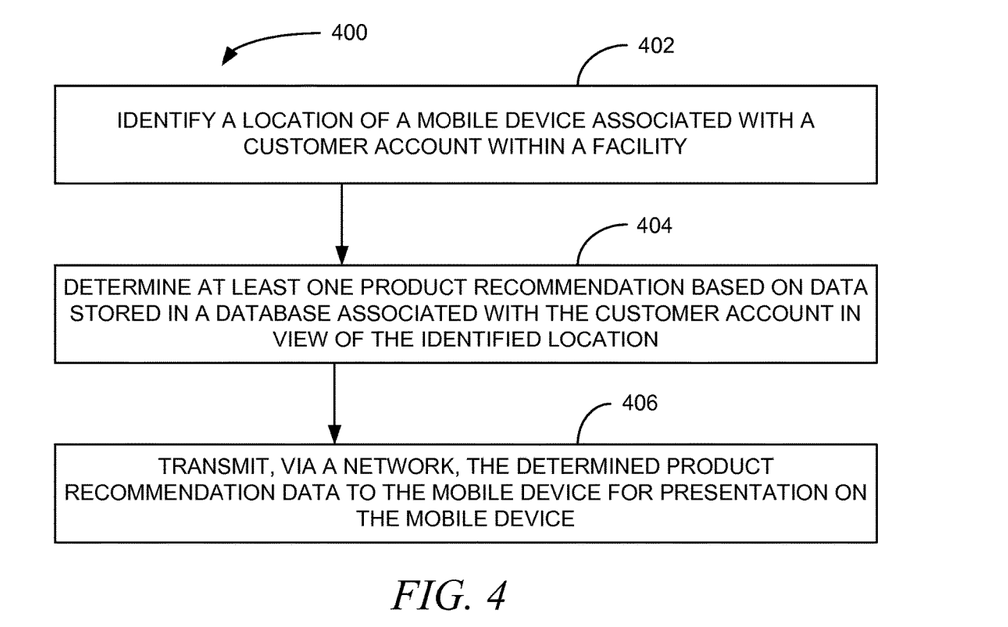
FIG. 4 is a block flow diagram of a method, according to an example embodiment.

FIG. 4 is a block flow diagram of a method 400, according to an example embodiment. The method 400 is an example of a method that may be performed in whole or in part on a server, such as the server 112 of FIG. 1. The method may also be performed in part, in some embodiments, on a mobile device, such as mobile device 108 also of FIG. 1.

The method 400 includes identifying 402 a location of a mobile device associated with a customer account within a facility and determining 404 at least one product recommendation based on data stored in a database associated with the customer account in view of the identified location. The method 400 may then transmit 406, via a network, the determined product recommendation data to the mobile device for presentation on the mobile device.

In some such embodiments, the data stored in the database associated with the customer account includes data representative of a plurality of a customer purchase history, a customer wish list, a customer shopping list, customer provided product preferences, and customer analytic data generated for the customer, among other data in other embodiments. The at least one determined 402 product recommendation may include a particular product identified as a product commonly purchased by other customers when the other customers have purchased a product included in at least one of the customer account data. In one such embodiment, the particular product recommendation is transmitted via the network to the mobile device with location data identifying a location of the product within the facility. Such location data is renderable within a facility map, such as the facility map 300 of FIG. 3, when presented on the mobile device. The product recommendation data transmitted to the device may further include information regarding the particular product that is also renderable on the mobile device. Some embodiments may further include transmitting a command via the network to a product presentation module deployed within the facility at a location of the particular product of the product recommendation, such as smart shelf 228 or the smart rack 232 illustrated and described with regard to FIG. 2. Such a command may instruct the product presentation module to perform at least one function of activating an attraction feature and presenting the particular product.

In some embodiments, identifying 402 the location of the mobile device associated with the customer includes iteratively determining an unfiltered location based on at least three received beacon signals, beacon location data retrieved from a database for the beacons from which the beacon signals were received, and application of a triangulation algorithm to the beacon location data. Such embodiments may further include iteratively determining a filtered location by calculating a location average and standard deviation from at least three most recently determined unfiltered locations and applying the triangulation algorithm to at least three most recently determined unfiltered locations that are less than the standard deviation from the location average.

In some embodiments, identifying 402 the location of the mobile device further includes generating a path prediction of a path the mobile device is likely to travel based on the identified location and a plurality of previously identified locations. The product recommendations in such embodiments may be also be determined 404 at least in part on the generated path prediction. In some embodiments, generating a path prediction of the path the mobile device is likely to travel based on the identified location includes iteratively generating a path predication through application of a Kalman filter algorithm to a plurality of most recently determined unfiltered locations. This is performed to determine a path having a velocity and a direction over a path period equal in duration to a period over which the plurality of most recently determined unfiltered locations were determined. A calculation of a distance variance from the path by the plurality of most recently determined unfiltered locations is then made. A calculation of the path prediction is made in a shape, such as a cone or oval, starting a distance behind a most recent filtered location and extending in the direction of the determined path for distance equal to a number of path periods multiplied by the velocity. The shape has a maximum width at the end of each path period equal to the distance variance multiplied by a number of elapsed path periods.

The method 400 may further include receiving a product query via the network from the mobile device and retrieving product data from a product database of a product of the product query. The product data may include location data of a location where the product of the product query is located within the facility. Such embodiments may then transmit the product data including the location data via the network to the mobile device. The location data transmitted is renderable within a facility map presented on the mobile device to guide a customer carrying the mobile device to the location of the product of the product query.

Figure 5:
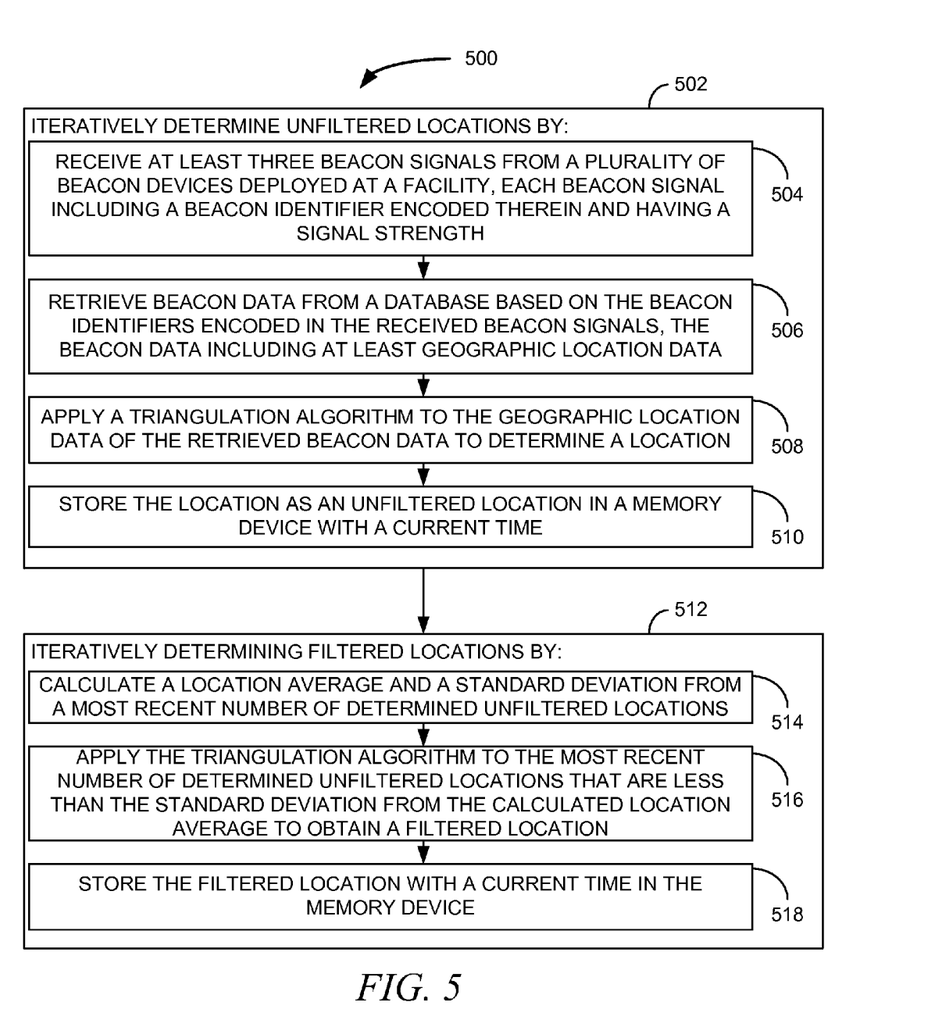
FIG. 5 is a block flow diagram of a method, according to an example embodiment.

FIG. 5 is a block flow diagram of a method 500, according to an example embodiment. The method 500 is an example of a method that may be performed to determine a location on a mobile device, on a server in communication with a mobile device, or a combination of both. The method 500 includes iteratively determining 502 unfiltered locations and iteratively determining 512 filtered locations.

In some embodiments of the method 500, iteratively determining 502 unfiltered locations includes receiving 504 at least three beacon signals from a plurality of beacon devices deployed at a facility. Each received beacon signal includes a beacon identifier encoded therein and has a signal strength. Determining 502 unfiltered locations further includes retrieving 506 beacon data from a database based on the beacon identifiers encoded in the received beacon signals. The retrieved beacon data includes at least geographic location data. Next, the method 500 in determining 502 unfiltered locations applies 508 a triangulation algorithm to the geographic location data of the retrieved beacon data to determine a location and stores 510 the location as an unfiltered location in a memory device with a current time. Determining 502 unfiltered locations may then be performed again with regard to newly received 504 beacon signals.

In some embodiments of the method 500, retrieving 506 the beacon data further includes retrieving a beacon signal calibration multiplier from the database for each of the plurality of beacon devices from which beacon signals were received when a beacon signal calibration multiplier is present for a respective beacon device. The method 500 in such embodiments then applies the beacon calibration multipliers to respective beacon signal strengths.

The method 500 also continues by iteratively determining 512 filtered locations. Determining 512 filtered locations, in some embodiments, includes calculating 514 a location average and a standard deviation from a most recent number of determined 502 unfiltered locations, such as four most recently determined 502 unfiltered locations. The method 500 in determining 512 filtered locations may then apply 516 the triangulation algorithm to the most recent number of determined 502 unfiltered locations that are less than the standard deviation from the calculated 514 location average to obtain a filtered location. The filtered location may then be stored 518 with a current time in the memory device. The iterative determination may then iterate and determine 512 a next filtered location upon determination 502 of another unfiltered location.

Figure 6:
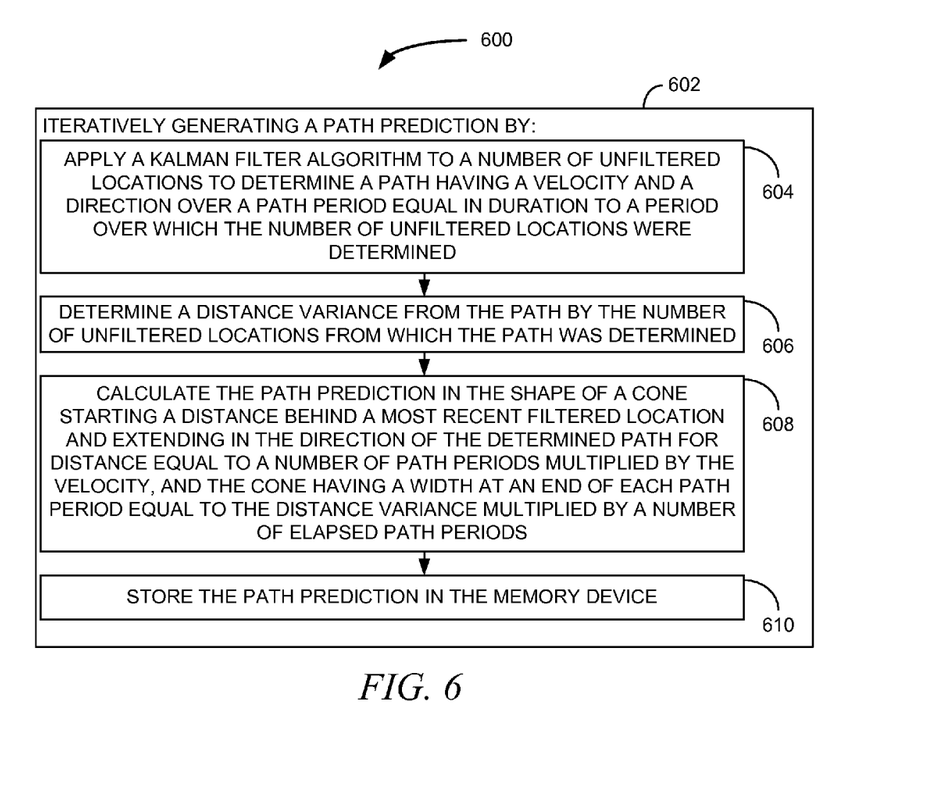
FIG. 6 is a block flow diagram of a method, according to an example embodiment.

In some embodiments, the method 500 may also continue to the method 600 to generate 602 a path prediction. The method 600 includes iteratively generating 602 a path prediction by applying 604 a Kalman filter algorithm to a number of unfiltered locations, such as four, to determine a path having a velocity and a direction over a path period equal in duration to a period over which the number of unfiltered locations were determined. The method 600 may then determine 606 a distance variance from the path by the number of unfiltered locations from which the path was determined. The path prediction may then be calculated 608 in the shape of a cone, or other shape such as an oval, polygon, or other shape in various embodiments, starting a distance behind a most recent filtered location, such as three feet, and extending in the direction of the determined path. The cone, or other shape extends for distance equal to a number of path periods multiplied by the velocity. The cone, or other shape has a width at an end of each path period equal to the distance variance multiplied by a number of elapsed path periods. The path prediction may then be stored 610 in the memory device, such as a memory device of the computing device performing the methods 500 and 600. When the methods 500 and 600 are performed in whole or in part on a server, the determined 512 filtered locations and generated 602 path prediction may also be transmitted to the mobile device. The mobile device may then update one or both of a current position plotted on a presented map of the facility where the beacon device are deployed and present the generated 602 path projection.

Returning to the method 500 of FIG. 5, the method 500 in some embodiments further includes a server determining the mobile device is present at a facility based on data representative of a beacon signal received via a network from the mobile device. Such embodiments may then retrieve beacon data from the database with regard to all beacons associated with a facility identifier included in a row of data in the database of associated with a beacon identifier included in the data representative of a beacon signal received from the mobile device. A facility map associated with the facility identifier may then be retrieved and transmitted to the mobile device along the retrieved beacon data. The facility map typically includes geographic location metadata corresponding to geographic location data of filtered and unfiltered locations as well as generated 602 path projections. Based on this data, the mobile device can not only present the map and plot current locations thereon, but can also calculate and update position data when connectivity with the server is lost based on newly received beacon signals.

Figure 7:
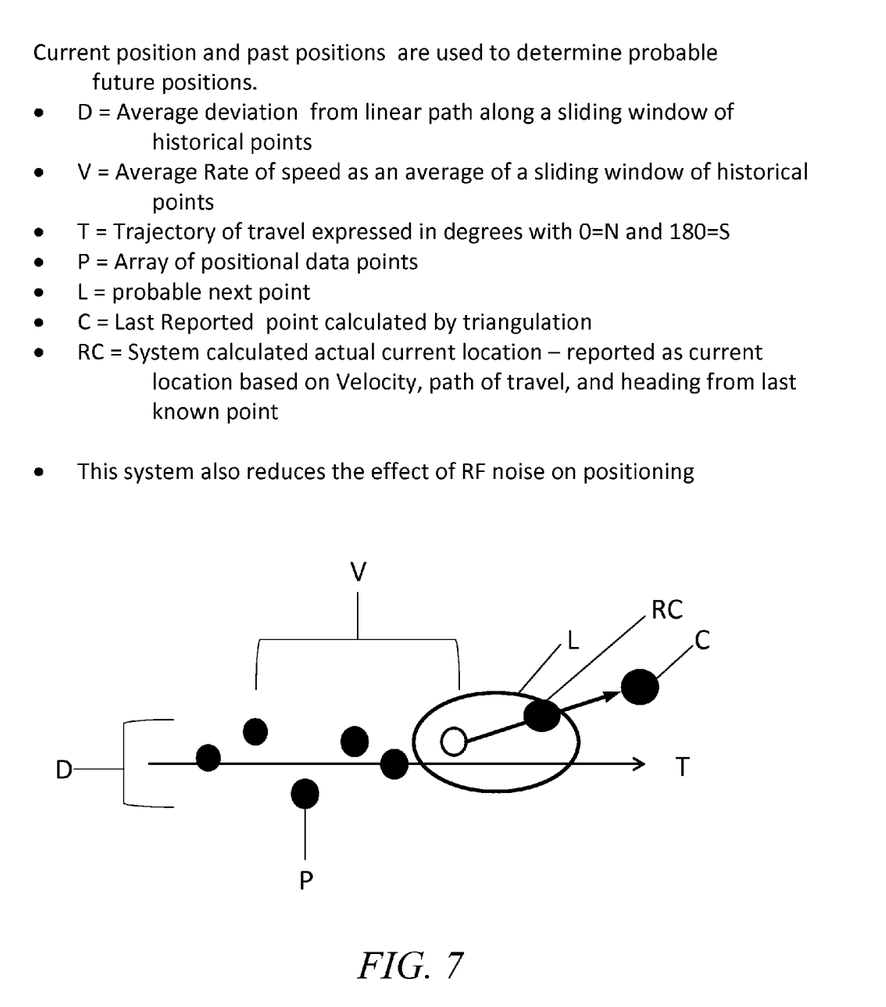
FIG. 7 is a location plot diagram and path projection illustration, according to an example embodiment.

FIG. 7 is a location plot diagram and path projection illustration, according to an example embodiment. The illustration provides an illustration of how an path projection is calculated and how a currently location is determined by a mobile device app when the mobile device app has a path projection but has lost connectivity with a server that calculated the path projection or is between path projection updates that may be received periodically.

The illustration of FIG. 7 includes a number of points P represented by closed black circles that are previously determined locations and an open circle that is a current location. The previously determined locations and current location are not in a straight line as they represent a meandering path of a customer through a facility. A Kalman filter algorithm is applied to the previously determined locations and current location to determine a velocity V and a direction of a path T over a period equal in duration to a period over which the previously determined locations and current location were determined. An average deviation D, or variance, from the determined path T is then determined as illustrated by bracket D. The path prediction is then determined in a shape, such as an oval as illustrated in FIG. 7, beginning behind the current location and extending a distance in the direction of the path T for a distance at least equal to a distance covered during a next period equal in duration to a period over which the previously determined locations and current location were determined. A maximum width of the shape at the end of the distance is equal to the average deviation D. If the shape is extended a distance equal to two of such periods, the maximum width of the shape will be two times the average deviation.

Figure 8:
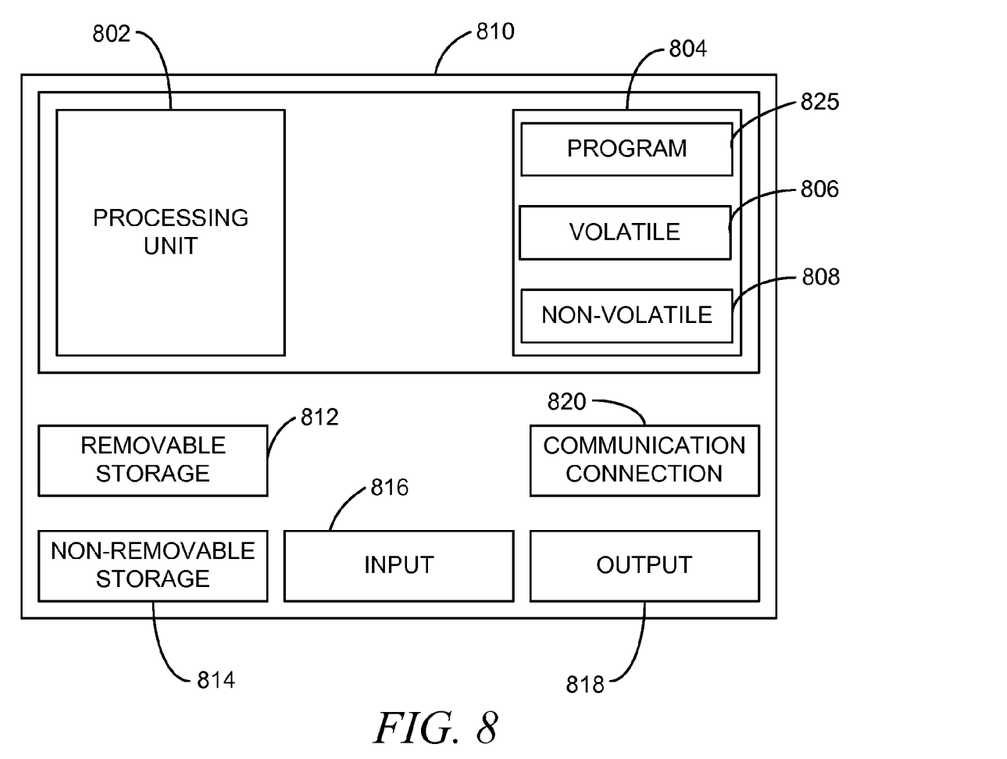
FIG. 8 is a block diagram of a computing device, according to an example embodiment.

FIG. 8 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 810, may include a processing unit 802, memory 804, removable storage 812, and non-removable storage 814. Although the example computing device is illustrated and described as computer 810, the computing device may be in different forms in different embodiments. For example, the computing device may instead be a smartphone, a tablet, smartwatch, or other computing device including the same or similar elements as illustrated and described with regard to FIG. 8. Devices such as smartphones, tablets, and smartwatches are generally collectively referred to as mobile devices. Further, although the various data storage elements are illustrated as part of the computer 810, the storage may also or alternatively include cloud-based storage accessible via a network, such as the Internet.

Returning to the computer 810, memory 804 may include volatile memory 806 and non-volatile memory 808. Computer 810 may include—or have access to a computing environment that includes a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 810 may include or have access to a computing environment that includes input 816, output 818, and a communication connection 820. The input 816 may include one or more of a touchscreen, touchpad, mouse, keyboard, camera, one or more device-specific buttons, one or more sensors integrated within or coupled via wired or wireless data connections to the computer 810, and other input devices. The computer 810 may operate in a networked environment using a communication connection 820 to connect to one or more remote computers, such as database servers, web servers, and other computing device. An example remote computer may include a personal computer (PC), server, router, network PC, a peer device or other common network node, or the like. The communication connection 820 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 820 may also or alternatively include a transceiver device, such as a BLUETOOTH® device that enables the computer 810 to wirelessly receive data from and transmit data to other BLUETOOTH® devices.

Computer-readable instructions stored on a computer-readable medium are executable by the processing unit 802 of the computer 810. A hard drive (magnetic disk or solid state), CD-ROM, and RAM are some examples of articles including a non-transitory computer-readable medium. For example, various computer programs 825 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    identifying a location of a mobile device associated with a customer account within a facility, wherein identifying the location of the mobile device associated with the customer includes:
        iteratively determining an unfiltered location based on at least three received beacon signals, beacon location data retrieved from a database for the beacons from which the beacon signals were received, and application of a triangulation algorithm to the beacon location data; and
        iteratively determining a filtered location by calculating a location average and standard deviation from at least three most recently determined unfiltered locations and applying the triangulation algorithm to at least three most recently determined unfiltered locations that are less than the standard deviation from the location average;
    determining at least one product recommendation based on data stored in a database associated with the customer account in view of the identified location;
    transmitting, via a network, the determined product recommendation data to the mobile device for presentation on the mobile device; and
    wherein:
        identifying the location of the mobile device includes generating a path prediction of a path the mobile device is likely to travel based on the identified location and a plurality of previously identified locations; and
        determining the at least one product recommendation is further determined based on the generated path prediction.

2. The method of claim 1, wherein:
    data stored in the database associated with the customer account includes data representative of a plurality of:
        customer purchase history;
        a customer wish list;
        a customer shopping list;
        customer provided product preferences; and
        customer analytic data generated for the customer.

3. The method of claim 2, wherein the at least one product recommendation includes a particular product identified as a product commonly purchased by other customers when the other customers have purchased a product included in at least one of the customer purchase history, the customer wish list, and the customer shopping list when the identified location is in proximity within the facility of a location of the particular product.

4. The method of claim 3, wherein the particular product recommendation is transmitted via the network to the mobile device with location data identifying a location of the product within the facility, the location data renderable within a facility map presented on the mobile device, the product recommendation data transmitted to the device further including information regarding the particular product renderable on the mobile device.

5. The method of claim 4, further comprising:
    transmitting a command via the network to a product presentation module deployed within the facility at a location of the particular product of the product recommendation, the command instructing the product presentation module to perform at least one function of activating an attraction feature and presenting the particular product.

6. The method of claim 1, wherein generating a path prediction of the path the mobile device is likely to travel based on the identified location includes:
    iteratively generating a path predication through application of a Kalman filter algorithm to a plurality of most recently determined unfiltered locations to determine a path having a velocity and a direction over a path period equal in duration to a period over which the plurality of most recently determined unfiltered locations were determined, calculation of a distance variance from the path by the plurality of most recently determined unfiltered locations, and calculation of the path prediction in a shape starting a distance behind a most recent filtered location and extending in the direction of the determined path for distance equal to a number of path periods multiplied by the velocity, and the shape having maximum a width at the end of each path period equal to the distance variance multiplied by a number of elapsed path periods.

7. The method of claim 6, wherein the shape is a cone.

8. The method of claim 1, wherein identifying the location of the mobile device is iteratively performed and the identified location of the mobile device is stored, the method further comprising:
   determining a plurality of identified locations are within a defined facility location area for at least a configured period; and
   performing at least one action configured in association with the defined facility location area.

9. The method of claim 8, wherein the at least one configured action includes at least one of:
   transmitting data representative of a promotional offer to the mobile device; and
   sending a message to facility personnel to approach a customer carrying the mobile device to offer assistance.

10. The method of claim 1, further comprising:
    receiving a product query via the network from the mobile device;
    retrieving product data from a product database of a product of the product query, the product data including location data of a location where the product of the product query is located within the facility; and
    transmitting the product data including the location data via the network to the mobile device, the location data renderable within a facility map presented on the mobile device to guide a customer carrying the mobile device to the location of the product of the product query.

11. A system comprising:
    at least one processor, at least one memory device, and at least one network interface device;
    a mobile device interaction module stored on the at least one memory device and executable by the at least one processor to perform data processing activities, the data processing activities comprising:
      identifying a location of a mobile device associated with a customer account within a facility, wherein identifying the location of the mobile device associated with the customer includes:
      iteratively determining an unfiltered location based on at least three received beacon signals, beacon location data retrieved from a database for the beacons from which the beacon signals were received, and application of a triangulation algorithm to the beacon location data; and
      iteratively determining a filtered location by calculating a location average and standard deviation from at least three most recently determined unfiltered locations and applying the triangulation algorithm to at least three most recently determined unfiltered locations that are less than the standard deviation from the location average;
      determining at least one product recommendation based on data stored in a database associated with the customer account in view of the identified location;
      transmitting, via the at least one network interface device to the mobile device, the determined product recommendation data for presentation on the mobile device; and
    wherein:
      identifying the location of the mobile device includes generating a path prediction of a path the mobile device is likely to travel based on the identified location and a plurality of previously identified locations; and
      determining the at least one product recommendation is further determined based on the generated path prediction.

12. The system of claim 11, wherein:
    data stored in the database associated with the customer account includes data representative of a plurality of:
    customer purchase history;
    a customer wish list;
    a customer shopping list; and
    the at least one product recommendation includes a particular product identified as a product commonly purchased by other customers when the other customers have purchased a product included in at least one of the customer purchase history, the customer wish list, and the customer shopping list when the identified location is in proximity within the facility of a location of the particular product; and
    the particular product recommendation is transmitted via the network interface device to the mobile device with location data identifying a location of the product within the facility, the location data renderable within a facility map presented on the mobile device, the product recommendation data transmitted to the device further including information regarding the particular product renderable on the mobile device.

13. The system of claim 11, wherein generating a path prediction of the path the mobile device is likely to travel based on the identified location includes:
    iteratively generating a path predication through application of a Kalman filter algorithm to a plurality of most recently determined unfiltered locations to determine a path having a velocity and a direction over a path period equal in duration to a period over which the plurality of most recently determined unfiltered locations were determined, calculation of a distance variance from the path by the plurality of most recently determined unfiltered locations, and calculation of the path prediction in a shape starting a distance behind a most recent filtered location and extending in the direction of the determined path for distance equal to a number of path periods multiplied by the velocity, and the shape having maximum a width at the end of each path period equal to the distance variance multiplied by a number of elapsed path periods.

14. The system of claim 11, wherein identifying the location of the mobile device is iteratively performed and the identified location of the mobile device is stored on the at least one memory device, the data processing activities of the mobile device interaction module further comprising:
    determining a plurality of identified locations are within a defined facility location area for at least a configured period; and
    performing at least one action configured in association with the defined facility location area.

15. The system of claim 14, wherein the at least one configured action includes at least one of:

transmitting data representative of a promotional offer to the mobile device; and sending a message to facility personnel to approach a customer carrying the mobile device to offer assistance.

16. The system of claim 11, the data processing activities of the mobile device interaction module further comprising:

receiving a product query via the network from the mobile device;

retrieving product data from a product database of a product of the product query, the product data including location data of a location where the product of the product query is located within the facility; and transmitting the product data including the location data via the network interface device to the mobile device, the location data renderable within a facility map presented on the mobile device to guide a customer carrying the mobile device to the location of the product of the product query.

* * * * *